Aug. 31, 1943.  R. K. LUNEBURG  2,328,157

OBJECTIVE

Filed Sept. 11, 1940

INVENTOR
RUDOLF K. LUNEBURG
BY
Raymond A. Paquin
ATTORNEY

Patented Aug. 31, 1943

2,328,157

UNITED STATES PATENT OFFICE 2,328,157

OBJECTIVE

Rudolf K. Luneburg, Buffalo, N. Y., assignor to Spencer Lens Company, Buffalo, N. Y., a corporation of New York Application September 11, 1940, Serial No. 356,342

3 Claims. (Cl. 88—57)

This invention relates to photographic and projection objectives and more particularly to such objectives which are especially well corrected for curvature of field and astigmatism.

An object of the invention is to provide a symmetrical lens system for an objective in which the curvature of the field is controlled by the thickness of the front and rear lens elements.

Another object of the invention is to provide an improved mount for lenses of the type set forth.

Another object of the invention is to provide a new and improved objective lens system which is economical in construction and efficient in operation.

Another object of the invention is to provide a new method of eliminating curvature of the field by controlling the thickness of the front and rear lenses.

Other objects and advantages of the invention will be apparent from the following description taken in connection with the accompanying drawing. It will be understood that many changes in the details of construction and arrangements of parts may be made without departing from the scope of the invention as expressed in the accompanying claims. The preferred form has therefore been shown by way of illustration only.

Referring to the drawing.

Figure 1:
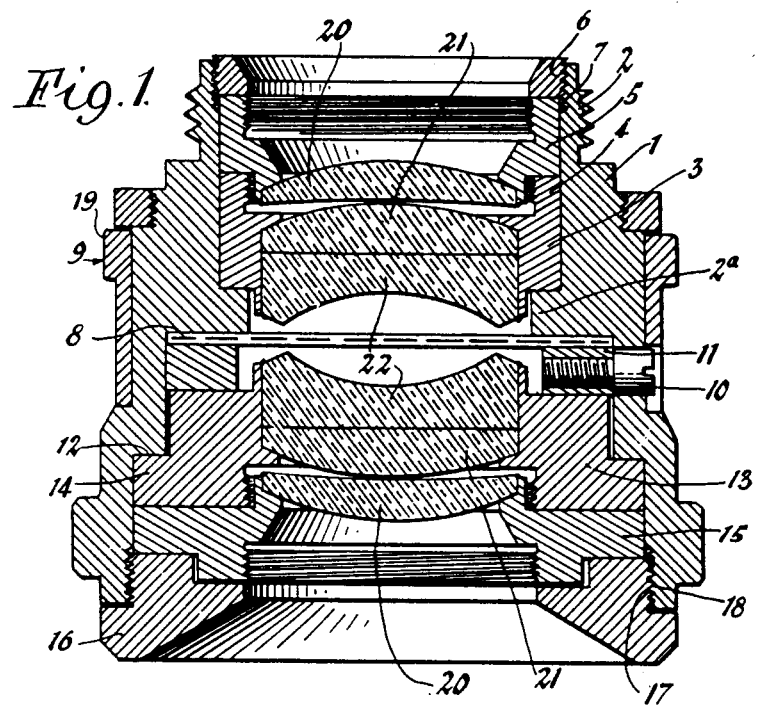
Fig. 1 is a sectional view taken on line 1—1 of Fig. 2.
Figure 2:
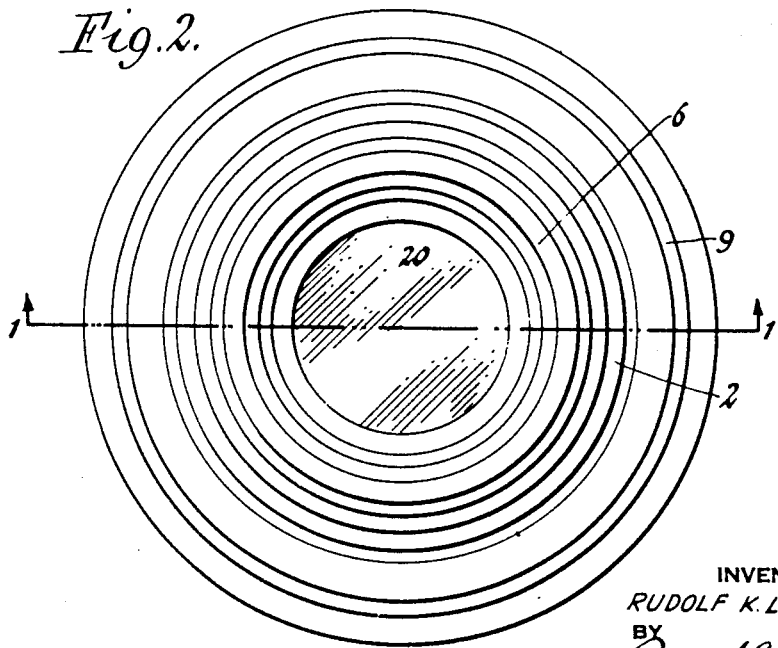
Fig. 2 is a top plan view of the lens and mount.

Referring more particularly to the drawing wherein similar reference characters designate corresponding parts throughout the several views, the mount comprises the main body portion 1 having the threaded portion 2 adjacent one end thereof adapted to be threaded into a projector or the like to hold the objective in operative position therewith. The body portion 1 has the internal shoulder 2a which is adapted to support a member 3 and the member 3 has the projecting flange 4 adapted to support the ring 5. The threaded ring 6 is adapted to be threaded into engagement with the internal threaded portion 7 adjacent the outer end of the member 1 to hold the rings 3 and 5 in proper position on the shoulder 2a.

On the lower side of the shoulder portion 2a is positioned the iris diaphragm 8 adapted to be operated by movement of the member 9 which telescopes on the member 1 and through movement of the member 9 the screw or the like 10 is caused to pivot which moves the ring 11, thereby opening or closing the iris diaphragm 8 to the desired opening.

The lower portion of the member 1 also has the shoulder 12 adapted to support the ring 13 by engagement with the shoulder portion 14 of said ring 13.

Over the lower end of the ring 13 is adapted to fit another ring 15 and rings 13 and 15 are adapted to be retained in position by the annular ring 16 which has a threaded portion 17 in threaded engagement with the internal threaded portion 18 adjacent the lower end of the portion 1.

The tubular member 9 has the knurled rim 19 which may be turned to control the iris diaphragm 8.

The lens system is symmetrical, that is, it is composed of three pairs of identical optical elements. For this reason the lens system is economical in that instead of it being necessary to manufacture six different lens elements, it is only necessary to make three different elements and in assembling the objective two of each of these three different elements are employed.

The lens system comprises the outer lenses 20 which are of crown optical glass of an index of refraction of about 1.572 and the lens elements 21 which are also of an optical crown glass with an index of refraction of about 1.572. The dispersion of both of the elements 20 and 21 is about 57.4.

The lens elements 22 which are cemented to the elements 21 are of flint glass with an index of refraction of about 1.579 practically equal to the index of refraction of the optical crown elements 20 and 21, but with a dispersion of about 41.6 which is considerably different. These lenses may be held in their respective rings by turning over the ends of the rings as shown in the drawing or separately threaded rings may be provided to retain the lenses in their respective rings as desired.

The thickness of the identical outer lens elements 20 has been found to be an effective control of the curvature of the field, that is, if the thickness of the lens element 20 is correct, that any curvature of field will be decreased and the field will be practically flat.

More particularly it has been found that with the particular lens system set forth, if the thickness of these outer lens elements 20 is not less than 5% nor more than 7% of the focal length of these outer lens elements, the desired field correction will be obtained.

For example, if the focal length of the outer lenses is 16 mm., the thickness thereof should be between .9 mm. and 1.1 mm.

Another example would be where the focal length of the outer lens elements 20 were 100 mm., in which case the thickness of the outer lenses should be not less than 5 mm. nor more than 7 mm.

From the above it will be seen that I have provided simple, efficient and economical means and method of obtaining a projection or photographic objective lens system in which the curvature of the field is controlled by controlling the thickness of the outer lenses, and also a new and improved mount for said lens system.

Having described my invention, I claim:

1. A mount for a projection or photographic objective lens system comprising a main body portion having an internal flange, a pair of annular lens supporting members adapted to slidingly fit in said body portion on one side of the diaphragm position with one of said annular members having a shoulder adapted to seat on said internal flange, a threaded ring adapted to engage an internal threaded portion adjacent the outer end of said body portion to retain the lens rings in aligned relation, an iris diaphragm positioned adjacent the opposite side of said internal flange, and a pair of annular lens supporting members slidingly positioned in said body portion on the other side of said iris diaphragm, one of said annular members having a shoulder adapted to engage a shoulder on the main body portion and the other of said members adapted to engage the first annular member, and an annular ring having a threaded portion adapted to engage an internal threaded portion adjacent the outer end of said body portion to retain said annular member in aligned relation.

2. A symmetrical lens system for producing a given total optical power, said lens system comprising a pair of reversely positioned substantially identical doublets formed of lens mediums of controlled indices of refraction and having optical surfaces and thicknesses controlled to produce given optical characteristics and a pair of outer lens elements of similar optical characteristics reversely positioned with respect to each other and each optically aligned with its respective doublet, the said outer lens systems being controlled as to indices of refraction, surface curvatures and thickness so as to function cooperatively with the doublets to produce the given total optical power desired, the thickness of said outer elements being controlled according to the particular focal length required of said elements so that said resultant thickness is not less than 5% and not more than 7% of said required focal length whereby the resultant lens system will produce a relatively flat focal field.

3. A symmetrical lens system for producing a given total optical power said lens system comprising a pair of substantially identical doublets, said doublets being formed of lens medium of controlled indices of refraction and having optical surfaces and thicknesses controlled to produce given optical characteristics, and a pair of outer lens elements, said doublets and outer lens elements being symmetrically arranged to a center and reversely positioned with respect to each other with each of said outer lens elements being aligned with one of said doublets, the said outer lenses being controlled as to indices of refraction, surface curvatures and thickness so as to function cooperatively with the doublets to produce the given total optical power desired, the thickness of said outer elements being controlled according to the particular focal length required of said elements so that said resultant thickness is not less than 5% and not more than 7% of said required focal length whereby the resultant lens system will produce a relatively flat focal field.

RUDOLF K. LUNEBURG.